(12) United States Patent
Rafferty et al.

(10) Patent No.: US 11,795,006 B2
(45) Date of Patent: Oct. 24, 2023

(54) DISTRIBUTION APPARATUS

(71) Applicant: M&K Holdings (Ireland) Limited, Dungannon (GB)

(72) Inventors: Nigel Rafferty, Dungannon (GB); Desmond Rafferty, Dungannon (GB)

(73) Assignee: M&K Holdings (Ireland) Limited, Northern Ireland (GB)

( * ) Notice: Subject to any disclaimer, the term of this patent is extended or adjusted under 35 U.S.C. 154(b) by 263 days.

(21) Appl. No.: 17/293,037

(22) PCT Filed: Nov. 4, 2019

(86) PCT No.: PCT/EP2019/080095
§ 371 (c)(1),
(2) Date: May 11, 2021

(87) PCT Pub. No.: WO2020/099168
PCT Pub. Date: May 22, 2020

(65) Prior Publication Data
US 2022/0002094 A1    Jan. 6, 2022

(30) Foreign Application Priority Data

Nov. 12, 2018  (GB) ..................... 1818403

(51) Int. Cl.
*B65G 47/16* (2006.01)
*B65G 37/00* (2006.01)
(Continued)

(52) U.S. Cl.
CPC ............ *B65G 47/16* (2013.01); *B65G 37/00* (2013.01); *B65G 69/0425* (2013.01); *B65G 47/715* (2013.01); *B65G 2201/04* (2013.01)

(58) Field of Classification Search
CPC .... B65G 47/16; B65G 37/00; B65G 69/0425; B65G 47/715; B65G 2201/04
(Continued)

(56) References Cited

U.S. PATENT DOCUMENTS 3,773,165 A * 11/1973 Tolles ..................... B65G 69/00
198/582
4,846,676 A * 7/1989 Mathis ...................... F27D 9/00
432/83
(Continued)

FOREIGN PATENT DOCUMENTS

CN    205034813 U    2/2016
CN    205114582 U    3/2016
(Continued)

OTHER PUBLICATIONS

Berion, Roland, Process and Apparatus for Making Coloured Decorative Panels From Exfoliated Rocks Particles, EP 0429330 B1 (Year: 1995).*

*Primary Examiner* — Gene O Crawford
*Assistant Examiner* — Lester Rushin, III
(74) *Attorney, Agent, or Firm* — LaMorte & Associates, PC.

(57) ABSTRACT

The invention relates to a machine for handling waste material, the machine comprising an upper conveyor member with a conveying portion of a first width, a downstream lower conveyor member with a receiving portion of equal or greater width and an apparatus for distributing material from the upper conveyor member to the downstream lower conveyor member, wherein the apparatus comprises oscillating means, a drive mechanism connected to the oscillating means; and a protruding element attached to the oscillating means for oscillatory movement thereof, wherein the protruding element is a reciprocating attachment adapted to oscillate in a direction transverse to the direction in which it (Continued)

extends, wherein the apparatus is mountable between the conveying portion of the upper conveyor member and the receiving portion of the downstream lower conveyor member such that the protruding element extends substantially in the direction of conveyance of the downstream conveyor member; and wherein in use the oscillating protruding element agitates material being transferred from the upper conveyor member to the downstream lower conveyor member.

13 Claims, 14 Drawing Sheets

(51) Int. Cl.
*B65G 69/04* (2006.01)
*B65G 47/71* (2006.01)

(58) Field of Classification Search
USPC .......................................................... 198/525
See application file for complete search history.

(56) References Cited

U.S. PATENT DOCUMENTS

| 5,637,836 A | * | 6/1997 | Nakagawa | ........... | G01G 13/026 |
| | | | | | 198/525 |
| 2016/0244267 A1 | * | 8/2016 | Rendell | ................ | B65G 11/203 |

FOREIGN PATENT DOCUMENTS

| CN | 107673089 U | 2/2018 |
| CN | 108584385 A | 9/2018 |

* cited by examiner

SECTION A-A

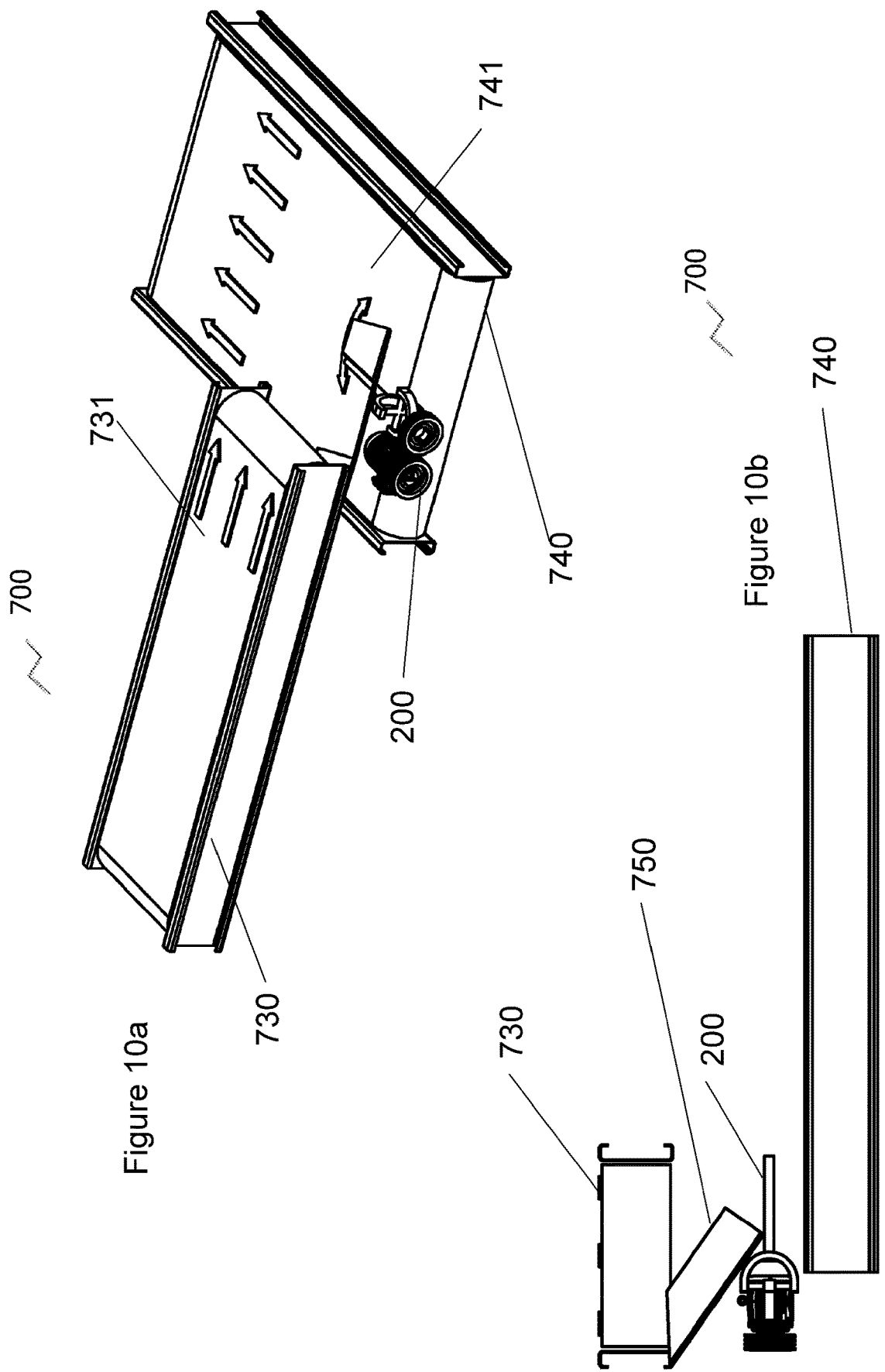

DISTRIBUTION APPARATUS

The present invention relates to a distribution apparatus for use in material handling, for example waste material handling, in particular for use in the recycling industry.

BACKGROUND TO THE INVENTION

Within the material handling industry, and with particular reference to the recycling industry, there is a need for the ability to spread material from a first conveyor member of a first width to a second conveyor member of equal or greater width in order to aid the further processing of the material further down the line. The material is usually a mixture of components including any of glass, wood, compost, scrap and residual sludge as well as commercial and domestic waste but may also be a more homogeneous mass.

Examples of further processing of, for example, waste material include sorting, classifying and/or shredding to reduce size. Machines involved in such further processing include screens, air separators, eddy current separators, optical sorters, robotic sorters, shredders and dryers. These types of equipment are most efficient when presented with a uniform layer of material, especially a monolayer of material, at the maximum width possible.

The device most commonly used in the recycling industry to present a uniform layer of material is a vibratory feeder, for example as disclosed in GB 1401631. Vibratory feeders work well on hard objects that can roll and tumble to become level as they move along the vibratory chute. However, vibratory feeders are practically useless when the material to be separated is sticky or interlocked with other material. Sticky or damp material, such as incinerator bottom ash and refuse-derived fuel, adheres to the surface of vibratory chutes, preventing the vibratory feeder from distributing the material evenly. Such sticky material takes on the path of least resistance preventing formation of a uniform layer and resulting in the need for periodic cleaning with associated downtime.

Another known device intended for presenting a uniform layer of material is described in EP 2486986. This distribution device uses two rotary plates. One problem with this rotary plate device is that the plates limit the size and type of material that may be used. Another disadvantage with this device is that material can easily get wrapped around the plates.

It is a therefore an object of the present invention to provide a machine for the distribution of waste material which alleviates the above disadvantages and/or provides a suitable alternative.

SUMMARY OF THE INVENTION

The present invention relates to a machine for handling waste material, the machine comprising an upper conveyor member with a conveying portion of a first width, a downstream lower conveyor member with a receiving portion of equal or greater width and an apparatus for distributing material from the upper conveyor member to the downstream lower conveyor member by way of a reciprocating attachment.

Accordingly, the present invention is a machine for handling waste material, the machine comprising an upper conveyor member with a conveying portion of a first width, a downstream lower conveyor member with a receiving portion of equal or greater width and an apparatus for distributing material from the upper conveyor member to the downstream lower conveyor member, wherein the apparatus comprises oscillating means, a drive mechanism connected to the oscillating means and a protruding element attached to the oscillating means for oscillatory movement thereof, wherein the protruding element is a reciprocating attachment adapted to oscillate in a direction transverse to the direction in which it extends, wherein the apparatus is mountable between the conveying portion of the upper conveyor member and the receiving portion of the downstream conveyor member such that the protruding element extends substantially in the direction of conveyance of the downstream conveyor member and wherein in use the oscillating protruding element agitates material being transferred from the upper conveyor member to the downstream lower conveyor member.

The protruding element is a reciprocating attachment adapted to oscillate in a direction transverse to the direction in which it extends.

The apparatus is preferably removably mountable between the conveying portion of the upper conveyor member and the receiving portion of the downstream conveyor member. The distribution apparatus may be removably fitted to a hire machine for processing material such that the hire machine could both be used to process material which requires uniform distribution, e.g. compost, and to process material which does not require uniform distribution such as aggregate or which could potentially damage the protruding element, e.g. concrete. For example, the apparatus could be fitted to the hire machine to process material which requires uniform distribution and removed from the machine in order to process other material.

In use, the distribution apparatus described herein is placed between two or more conveyor members. As material is conveyed from the conveying portion of at least a first upper conveyor member to the receiving portion of a downstream lower conveyor member, at least a portion of the material comes in contact with the reciprocating attachment of the apparatus such that this material is agitated by the reciprocating attachment and spread to the edges of the downstream conveyor member receiving portion. The remaining material, i.e. material conveyed from the conveying portion to the receiving portion but which passes by the reciproacting attachment, falls directly from the conveying portion to the receiving portion. As a result, when using the apparatus according to the invention, material is evenly distributed over the width of the downstream lower conveyor member receiving portion, thus ensuring more efficient further processing of the material.

The protruding element is adapted to receive material from the conveying portion of at least a first upper conveyor member at any angle. For example, the protruding element may extend in the direction of conveyance of the upper conveyor member thus receiving material at an angle of 0°. Alternatively, the protruding element may extend at an angle to the direction of conveyance of the upper conveyor member, such as for example at 90° thereto or opposite to the direction of conveyance of the upper conveyor member thus receiving material at an angle of 180°.

The protruding element extends in the direction of conveyance of the downstream conveyor member and is adapted to oscillate in a direction transverse to said direction of conveyance.

Additionally, the protruding element preferably extends in the direction of conveyance of the upper conveyor member or in the opposite direction to the direction of conveyance of the upper conveyor member and is adapted to oscillate in a direction transverse to said direction of conveyance.

In the embodiments wherein the protruding element does not extend in the direction of conveyance of the upper conveyor member, a chute is preferably placed between the upper conveyor member and the distribution apparatus such that material is conveyed to the chute prior to contact with the protruding element thus allowing the protruding element to receive material at the preferred angle of 0°.

The protruding element may be of any suitable size or shape which achieves the required distribution.

Preferably the protruding element comprises one or more extending portions, preferably three extending portions. The extending portions may be parallel to one another, i.e. at an angle of 0° to one another, or separated from one another by an angle α, wherein α is in the range of from about 1° to about 20° e.g. 10°.

Each extending portion independently preferably has a cross-section selected from among a circular, L-shaped, T-shaped, U-shaped, rectangular and square cross-section. For example, each extending portion independently may be an angle iron, a channel, a box section, an elongate rod or pole, or a tubular extension such as a pipe. However, these are not to be considered limiting and other shapes and cross-sections are considered to be within the scope of the invention.

Each extending portion independently may be solid or hollow. In a preferred embodiment, each extending portion is hollow to reduce material cost and weight.

Each extending portion independently is preferably in the range of from about 50 cm to about 150 cm long, e.g. about 70 cm long.

Preferably the protruding element further comprises an end plate. In this preferred embodiment, the extending portion may be attached to the end plate such that it is orthogonal to the end plate. Preferably, however, the extending portion is attached to the end plate such that it points downwards, particularly preferably at an angle β from the orthogonal position, wherein β is in the range of from about 2° to about 25° from the orthogonal position, e.g. 5°.

In a particularly preferred embodiment, the protruding element is in the form of a plurality of, e.g. three, elongate poles attached to an end plate. Particularly, preferably, the poles are attached to the end plate such that they splay out in a fan like fashion at an angle α to one another, wherein α is as defined hereinabove.

The protruding element may be made of metal such as steel, e.g. stainless steel, or aluminium, preferably mild steel, i.e. steel which typically contains 0.05% to 0.25% carbon. However, this is not to be considered to be limiting and other suitable materials may be used to manufacture the protruding element, such as for example wood, plastic or a composite material.

In use, the distribution apparatus defined herein is preferably attached to any one of the upper conveyor member, the downstream conveyor member or a frame adjacent either conveyor member, particularly preferably to a frame surrounding the downstream conveyor member but which does not move relative the downstream conveyor member such that the apparatus is in contact with the material stream being conveyed by the upper conveyor member to the downstream conveyor member. Alternatively, the apparatus is preferably attached to a track such that it may be manually or mechanically moved out of the material stream. However, these options are not to be considered limiting and any other suitable position for the distribution apparatus is contemplated within the scope of the invention.

In a preferred embodiment, the apparatus is for attachment to the downstream conveyor member such that the protruding element extends entirely or in part over the receiving portion of the downstream conveyor member. In an alternative preferred embodiment, the apparatus is for attachment to the underside of the upper conveyor member, for example for attachment to a chute mounted to the underside of the upper conveyor member.

The protruding element is preferably adapted to oscillate at a speed in the range of from about 50 oscillations per minute to about 250 oscillations per minute, preferably 180 oscillations per minute. By oscillation per minute is meant complete stroke from centre to left, through centre to right and back to centre per minute.

The protruding element preferably oscillates at single speed. However, oscillation at varied speed, e.g. more slowly in the centre, is also contemplated within the scope of the invention.

The drive mechanism preferably comprises a motor, for example an electric motor, hydraulic motor, or pneumatic motor, particularly preferably an electric motor.

The oscillating means preferably comprises a reciprocating arm. In this embodiment, the protruding element is attached to the reciprocating arm.

The oscillating means preferably further comprises a rotating flywheel.

The drive mechanism is preferably connected to the oscillating means by a belt, particularly preferably a belt and pulley system.

The drive mechanism is preferably provided with speed control to control the speed of oscillation of the protruding element.

Alternatively, or additionally, the drive mechanism is preferably provided with eccentric adjustment to control the length of movement and/or the angle of movement of the protruding element.

In a preferred embodiment, the upper conveyor member comprises a conveyor belt, a vibratory feeder or an auger feeder.

In a preferred embodiment, the downstream conveyor member comprises a conveyor belt, e.g. an accelerator belt. Alternatively, the downstream conveyor member is selected from among a screening machine, a shredder and a vibratory feeder. The downstream conveyor member preferably conveys the material to a machine for further processing, for example to a screening machine, an air separator, eddy current separator, optical sorter, robotic sorter or the like.

In a particularly preferred embodiment, the upper conveyor member comprises a vibratory feeder and the downstream conveyor member comprises a conveyor belt.

In a preferred embodiment, the machine further comprises an angled bracket with an aperture through which the protruding element extends. The angled bracket preferably has a top section for attachment to the upper conveyor member, a base section for attachment to a downstream conveyor member and a mid-section containing the aperture. The top and base section are preferably parallel to each other with the mid-section connecting the two such that the angle between the top section and the mid-section is in the range of from about 100° to about 160°, e.g. 135°.

BRIEF DESCRIPTION OF THE DRAWINGS

Certain preferred embodiments of the present invention will now be described, by way of example only, with reference to the accompanying drawings in which:

FIG. 3b shows a front view of the protruding element shown in FIG. 3a;

FIG. 7a shows the machine of FIGS. 4 to 6 with the vibratory feeder removed;

FIG. 7b shows an enlarged section of FIG. 7a;

FIGS. 9a to 12 show other preferred embodiments of material handling machines according to the invention.

DETAILED DESCRIPTION

Figure 1A:
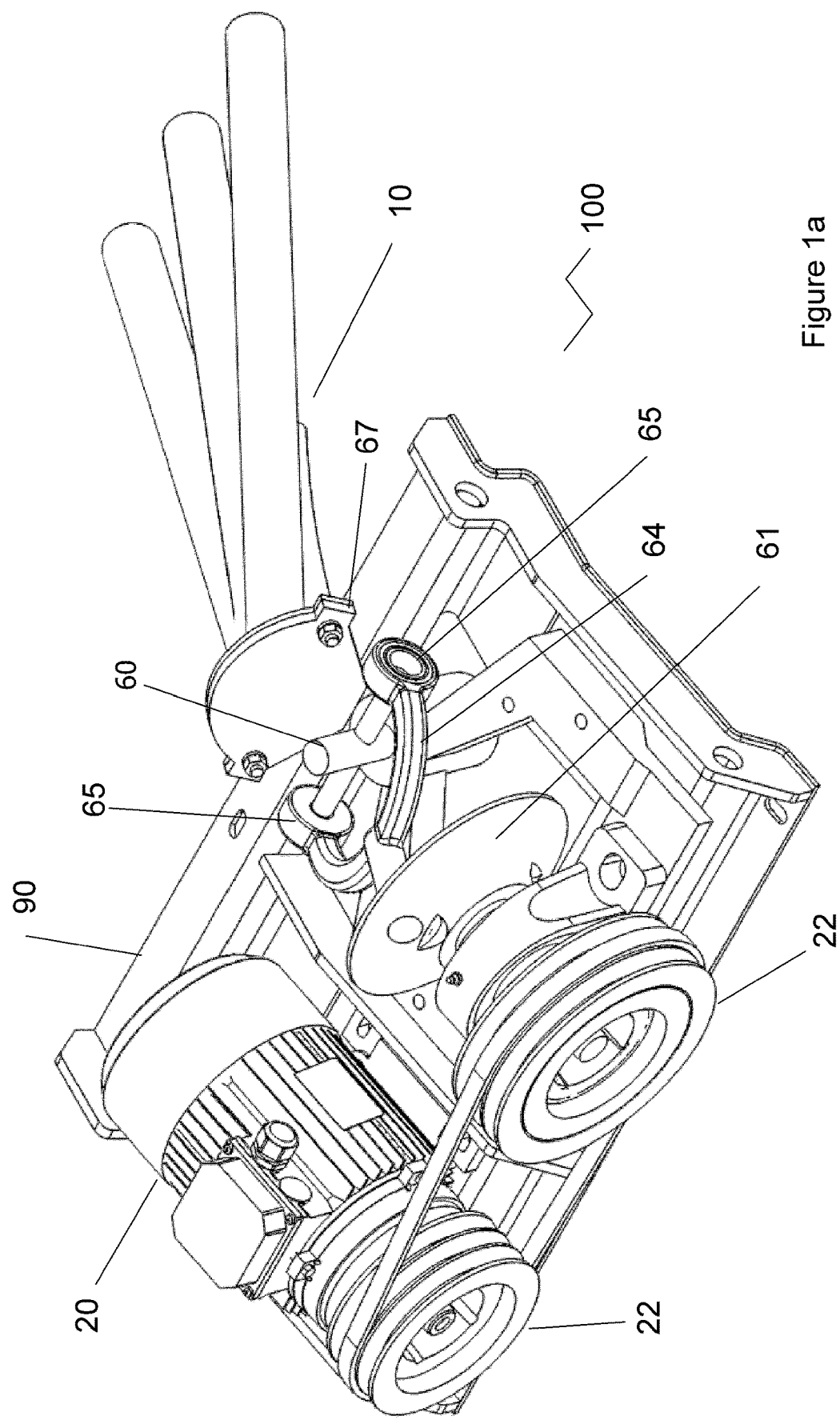
FIGS. 1a and 1b show perspective views of a preferred embodiment of the distribution apparatus described herein.

Various embodiments of the present invention will be described in detail with reference to the drawings, where like reference numerals represent like parts and assemblies throughout the several views.

Figure 1B:
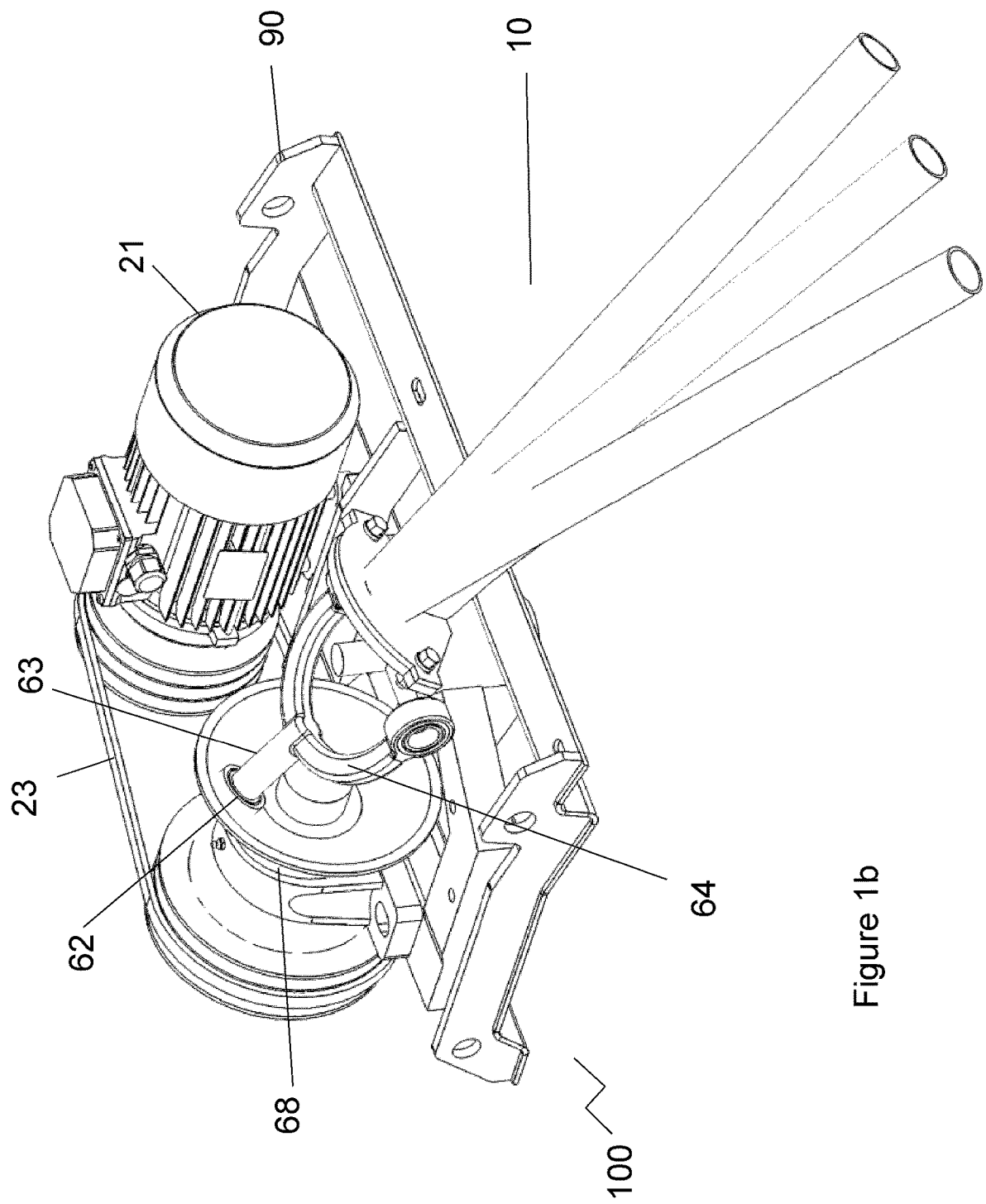
Figure 2:
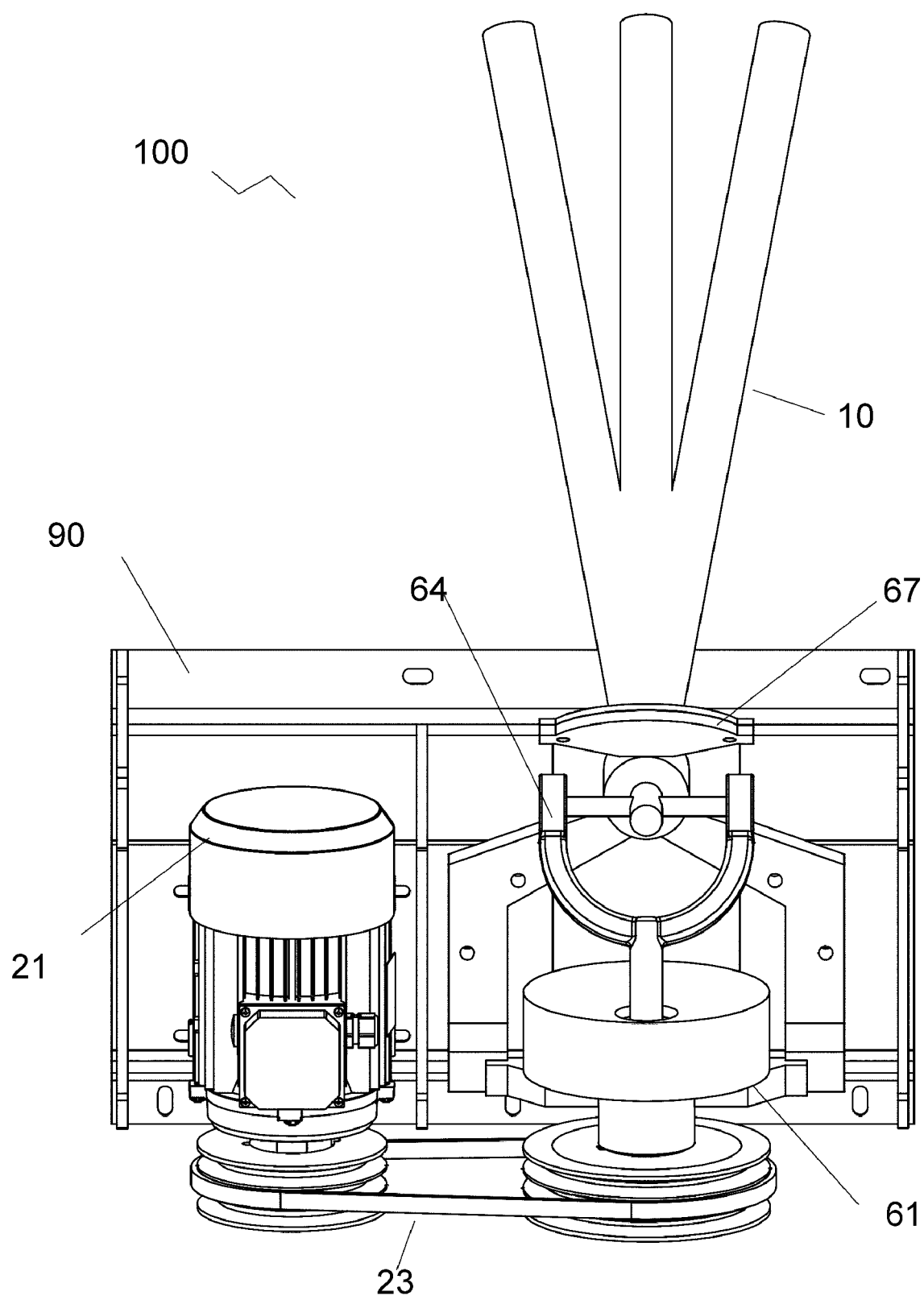
FIG. 2 shows a plan view of the distribution apparatus shown in FIGS. 1a and 1b.
Figure 3C:
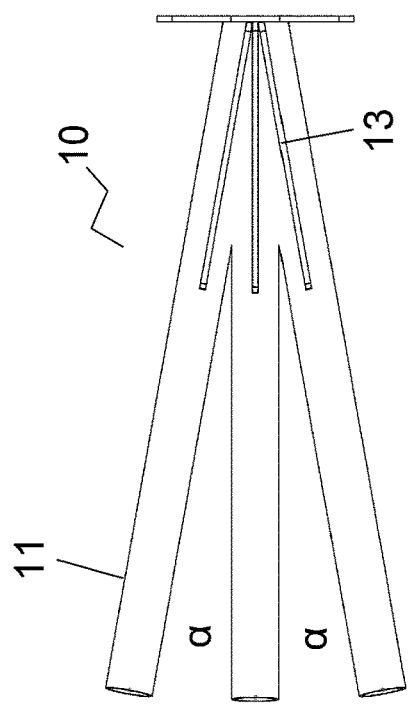
FIG. 3c shows a bottom view of the protruding element shown in FIGS. 3a and 3b.
Figure 3D:
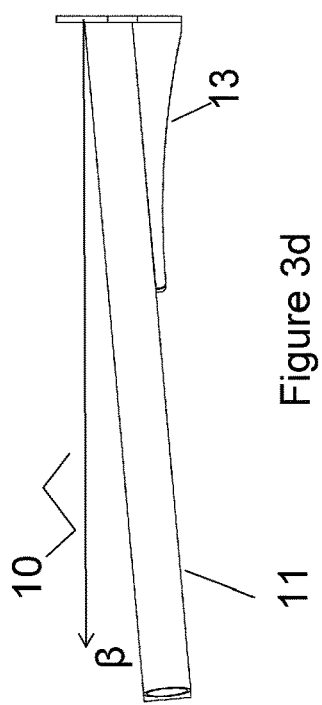
FIG. 3d shows a side view of the protruding element shown in FIGS. 3a to 3c.
Figure 3A:
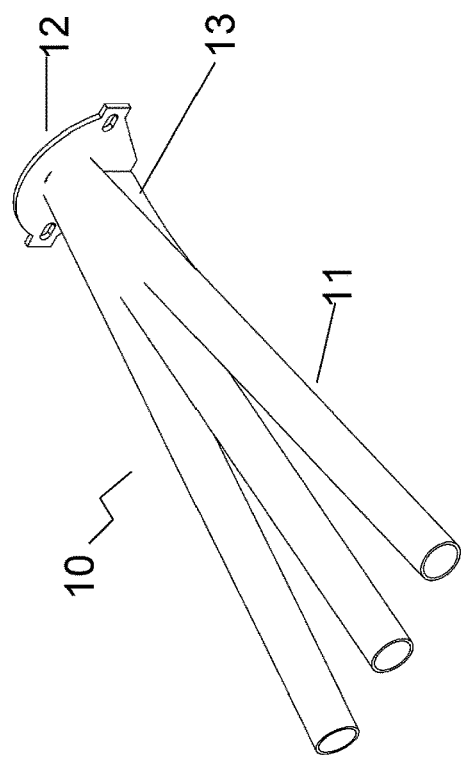
FIG. 3a shows a perspective view of the protruding element of the distribution apparatus shown in FIGS. 1a, 1b and 2.
Figure 3B:
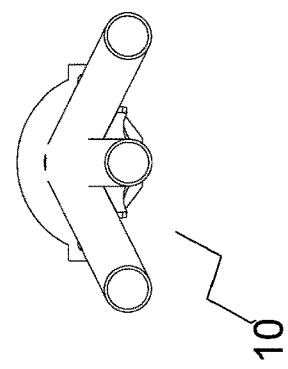
Figure 8:
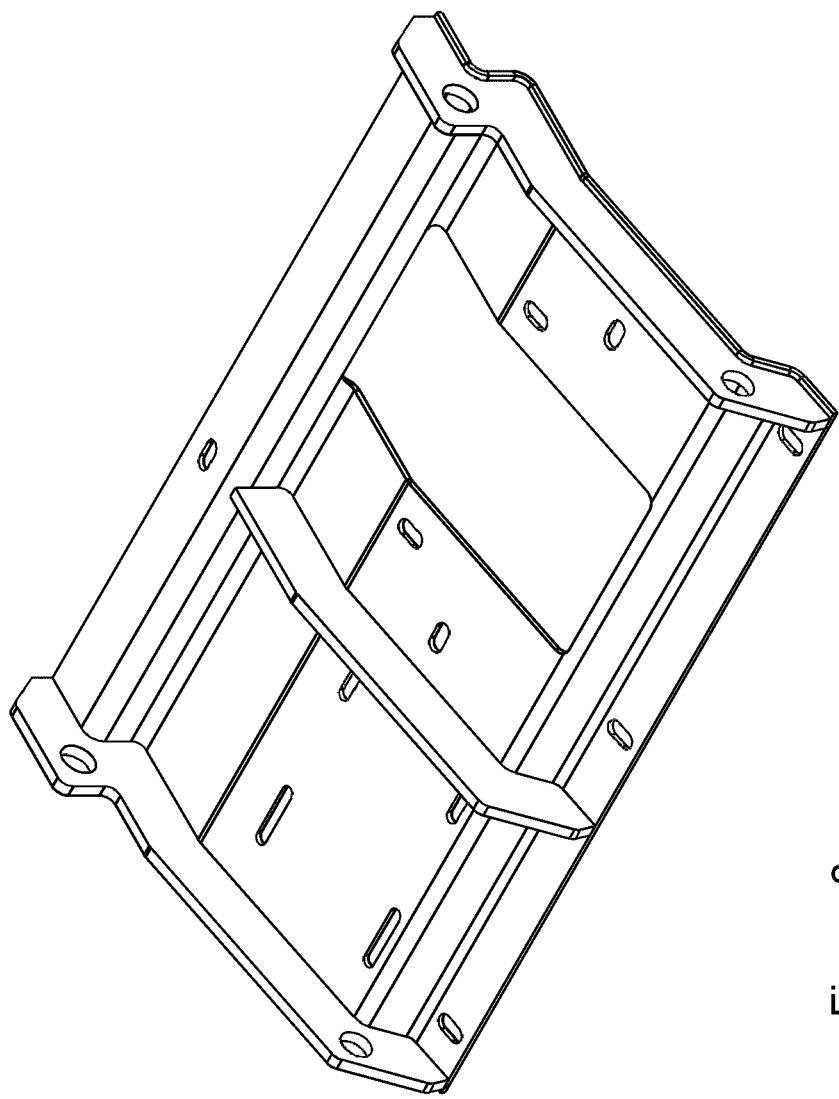
FIG. 8 shows a preferred mount for use with the distribution apparatus shown in FIGS. 1a and 1b.

Referring to the drawings, FIGS. 1a, 1b and 2 show a preferred distribution apparatus, generally referred to herein by reference numeral 100. As shown, distribution apparatus 100 comprises oscillating means 60, motor 21 connected to oscillating means 60 and protruding element 10 attached to oscillating means 60 for oscillatory movement thereof. Distribution apparatus 100 is shown mounted on frame 90 for attachment between an upper conveyor member and downstream conveyor member. Frame 90 is shown in FIG. 8.

Oscillating means 60 comprises rotating flywheel 61 provided with offset bearing 62 for creating a cam effect when rotated. Rotating flywheel 61 is rotated by electric motor 21 through pulleys 22 and belt 23. Bar 63 is attached to rotating flywheel 61 at offset bearing 62 and connects follower fork 64 to rotating flywheel 61. As rotating flywheel 61 rotates, bar 63 moves in a circular motion about the centre of flywheel 61. The horizontal movement component of this circular motion is transferred to protruding element 10 via follower fork 64 and base plate 67 to which protruding element 10 is bolted, while the vertical movement is removed by bearings 65 at the end of follower fork 64.

The dimensions between offset bearing 62 and the centre of flywheel 61 may be adjusted by means of rotating bearing 62 in eccentric collar 68 of flywheel 61, therefore adjusting the stroke.

As shown in FIGS. 3a to 3d, preferred protruding element 10 of distribution apparatus 100 comprises three elongate hollow poles 11 each connected at one end to end plate 12 such that the free ends of poles 11 splay out in a fan like fashion. Reinforcing brackets 13 extend from end plate 12 along at least a portion of the underside of each pole 11.

Poles 11 are attached to end plate 12 such that they point downwards at an angle β from the orthogonal position and are separated from one another by an angle α.

In the embodiment shown, poles 11 are attached to end plate 12 such that they point downwards at an angle of β=5° from the orthogonal position and at an angle of α=10° from one another.

Poles 11, end plate 12 and reinforcing brackets 13 as shown in the Figures are each made of mild steel. In the embodiment shown, each pole 11 is of 48.3 mm diameter with a 3.2 mm thick wall, i.e. 48.3 mm×3.2 mm circular hollow section, and end plate 12 and reinforcing brackets 13 are each 6 mm thick. However, this is not considered to be limiting and any suitable size is contemplated to be within the scope of the invention.

Distribution apparatus 100 is for distributing material from an upper conveyor member with a conveying portion of a first width to downstream conveyor member with a receiving portion of equal or greater width, wherein apparatus 100 is removably mountable, between the conveying portion and the receiving portion.

Protruding element 10 is adapted to oscillate at a speed in the range of from about 50 oscillations per minute to about 250 oscillations per minute, preferably 180 oscillations per minute.

Figure 4:
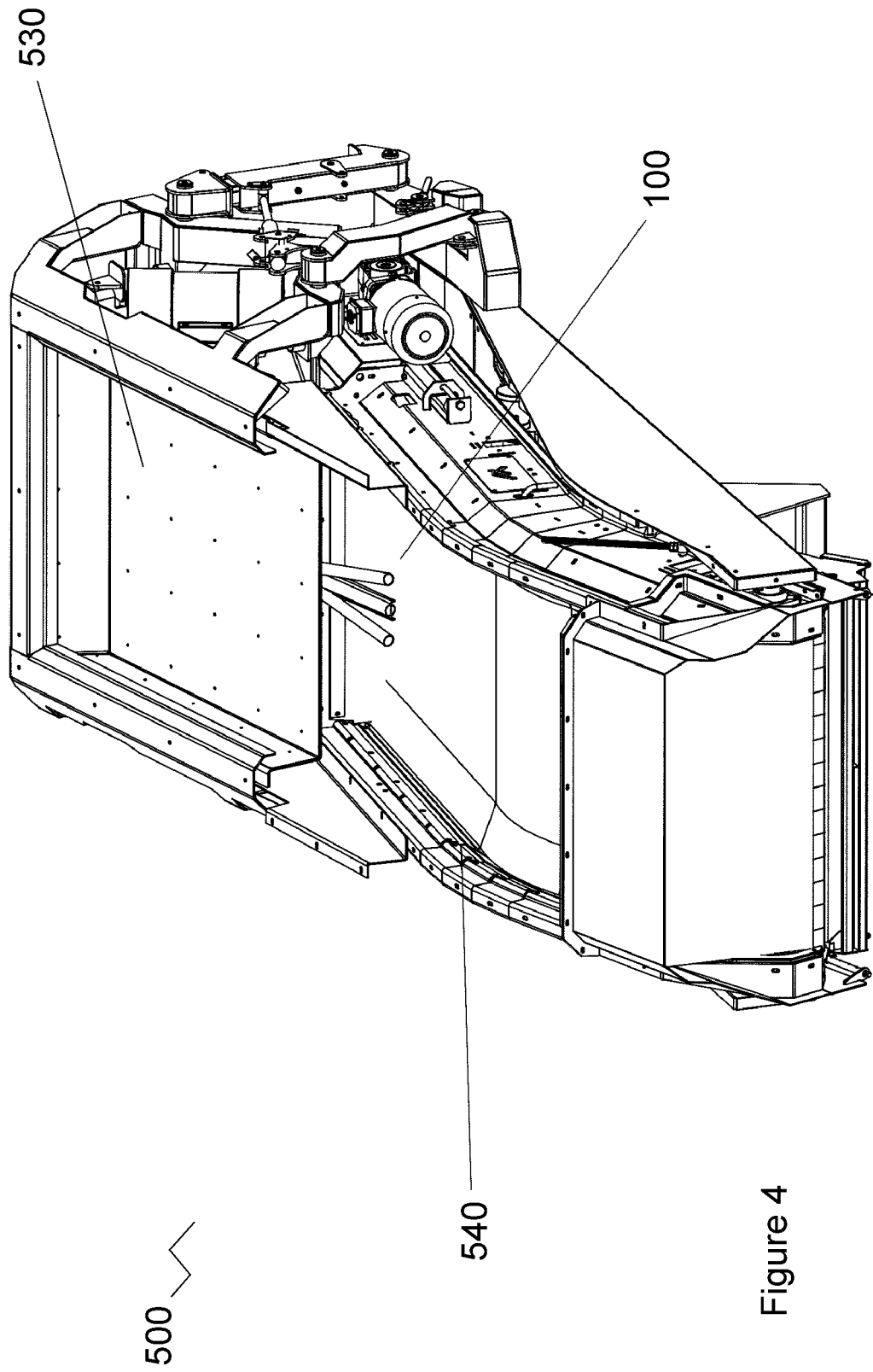
FIG. 4 shows a perspective view of a waste handling machine according to the invention and incorporating the distribution apparatus shown in FIGS. 1a and 1b.
Figure 5:
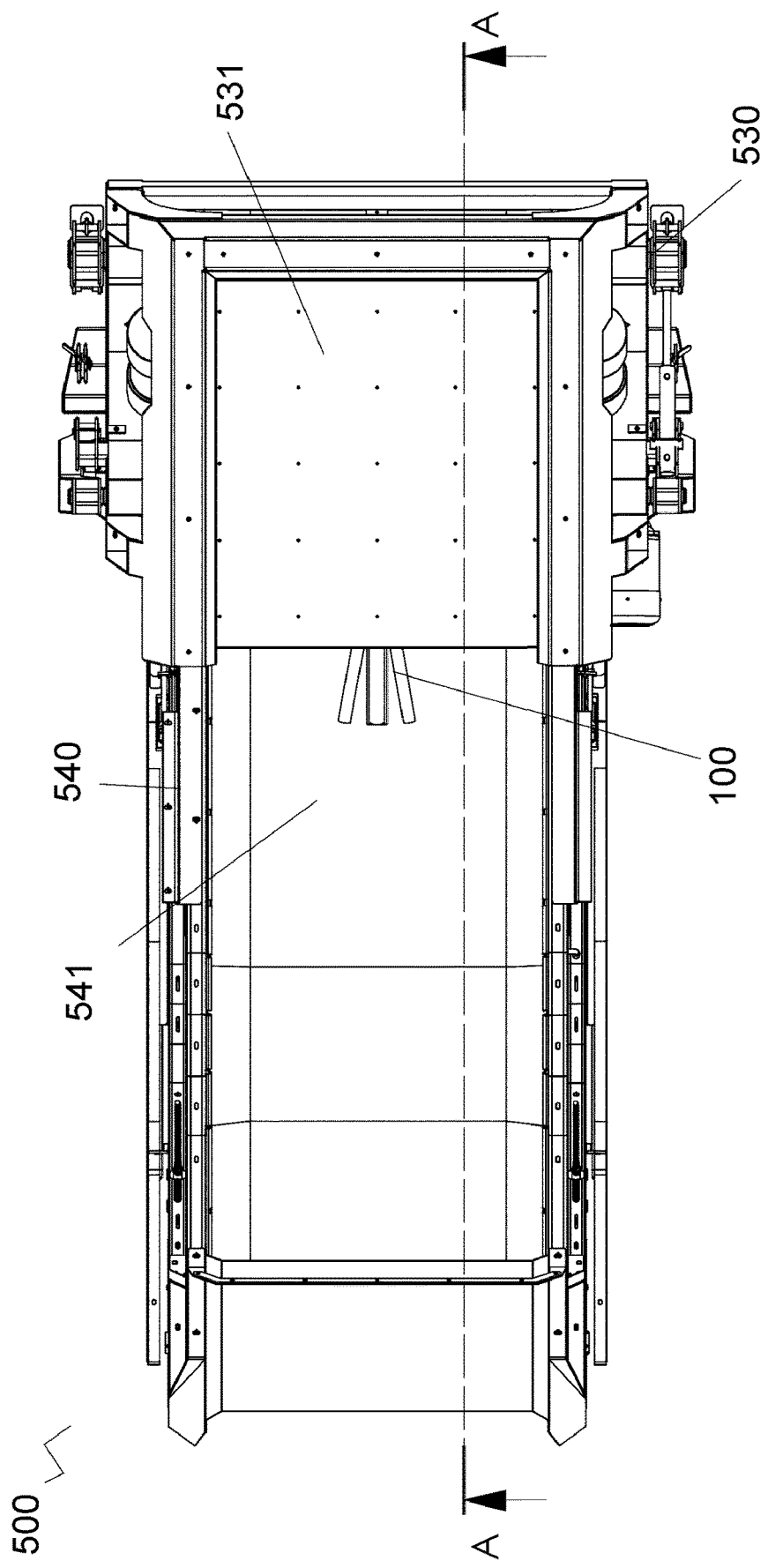
FIG. 5 shows a plan view of the machine shown in FIG. 4.
Figure 6:
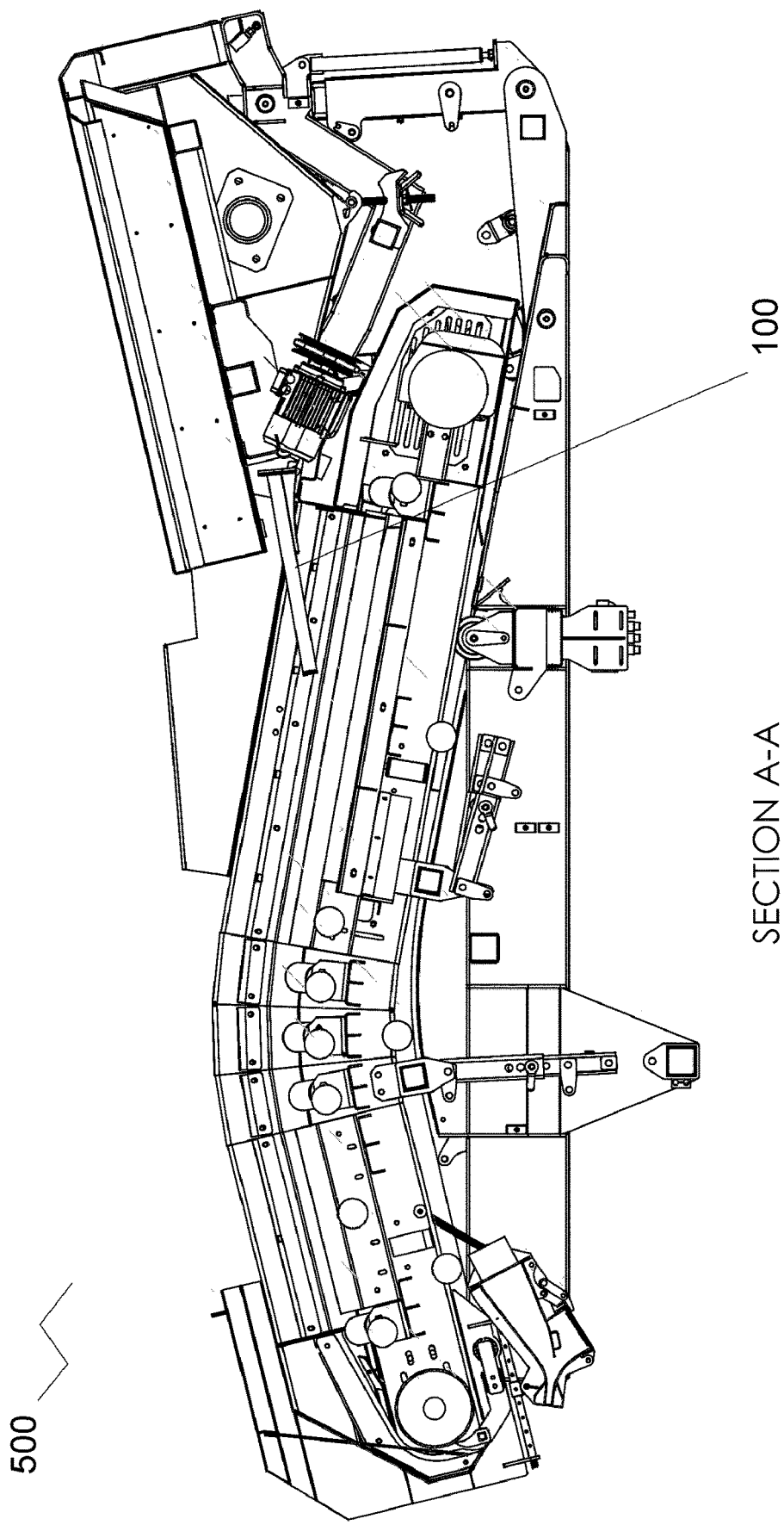
FIG. 6 shows a cross-sectional view along line A-A in FIG. 5.

FIGS. 4 to 6 show a preferred waste handling machine according to the invention, generally referred to herein by reference numeral 500. Waste handling machine 500 has distribution apparatus 100 disposed between vibratory feeder 530 and speed-up conveyor 540. In the embodiment shown, apparatus 100 is mounted adjacent receiving portion 541 of speed-up conveyor 540 such that end plate 12 and the portion of poles 11 reinforced by reinforcing brackets 13 are located under conveying portion 531 of vibratory feeder 530. Protruding element 10 of apparatus 100 extends substantially in the direction of conveyance of speed-up conveyor 540 and is adapted to oscillate in a direction transverse to the direction of conveyance of speed-up conveyor 540.

Figure 7:
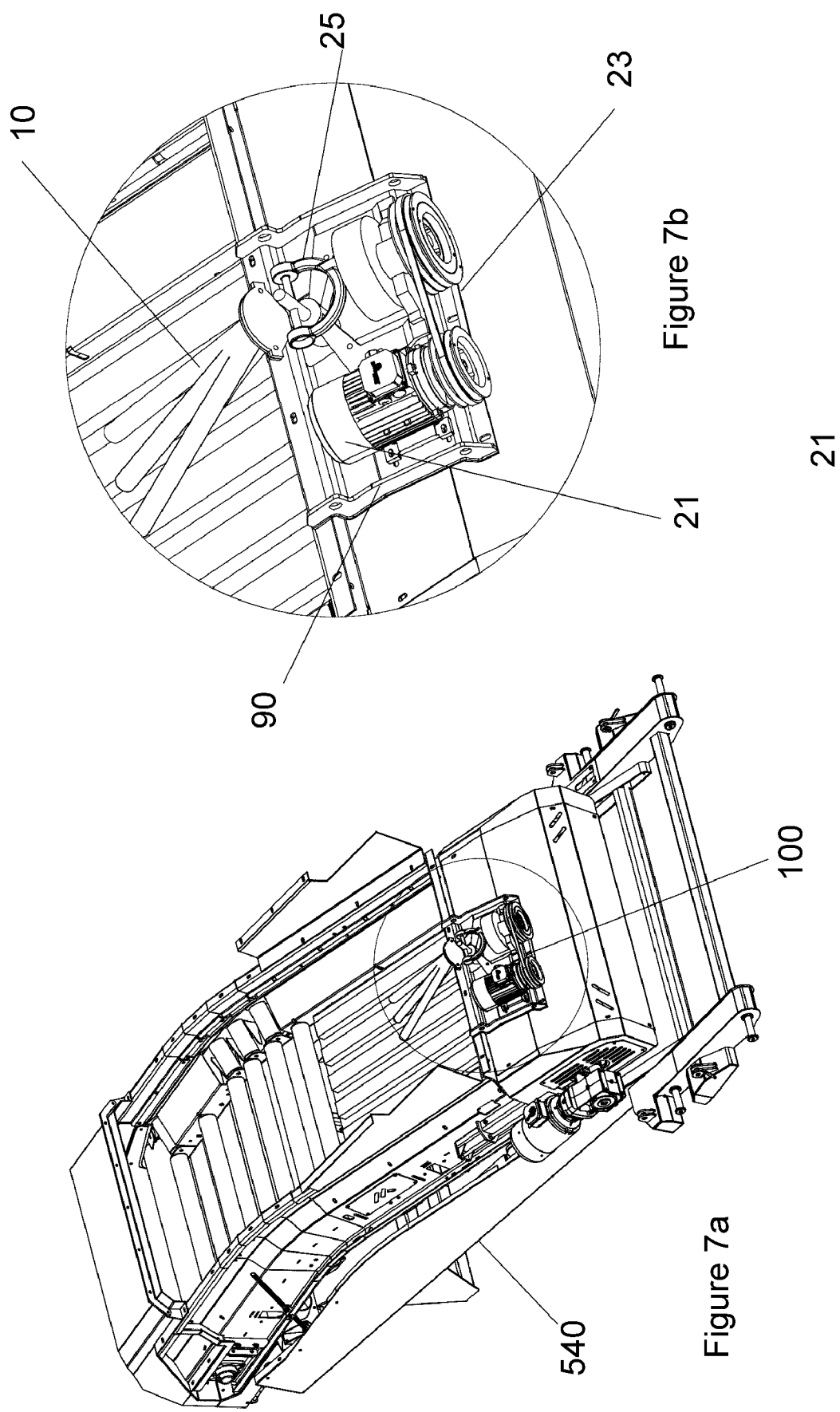

FIGS. 7a and 7b show distribution apparatus 100 mounted to speed-up conveyor 540 of waste handling machine 500 via frame 90. Vibratory feeder 530 has been removed from this Figure for clarity.

In FIGS. 4 to 7b, distribution apparatus 100 is shown to receive material from conveying portion 531 at any angle of 0°. This is a result of vibratory feeder 530 and speed-up conveyor 540 being in line such that protruding element 10 extends substantially in the direction of conveyance of vibratory feeder 530. However, this is not to be considered limiting and vibratory feeder 530 may instead be placed at an alternative angle to speed-up conveyor 540, e.g. at 90° thereto.

FIG. 8 shows a preferred mount 90 for attaching distribution apparatus 100 to speed-up conveyor 540.

Figure 9A:
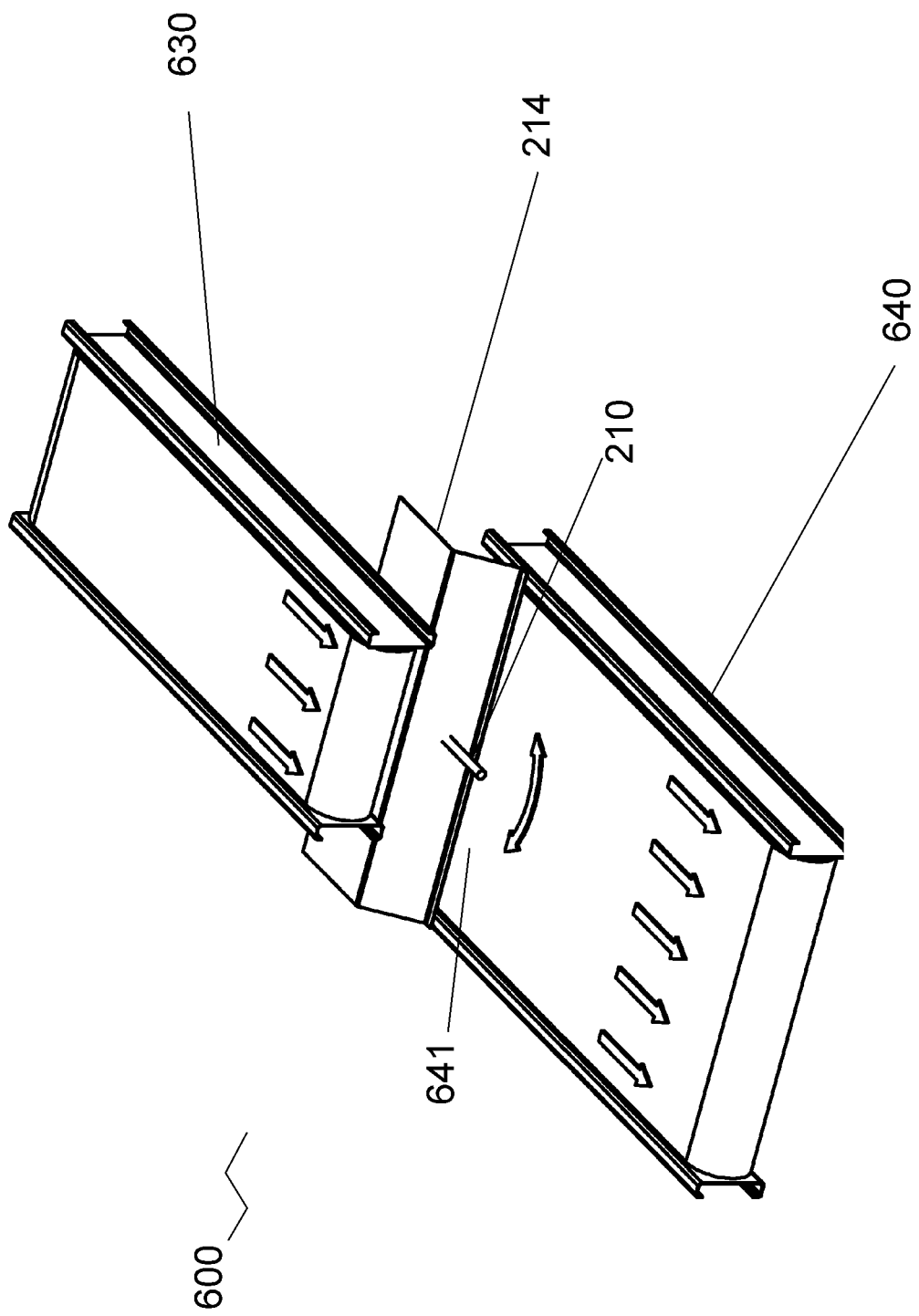
Figure 9B:
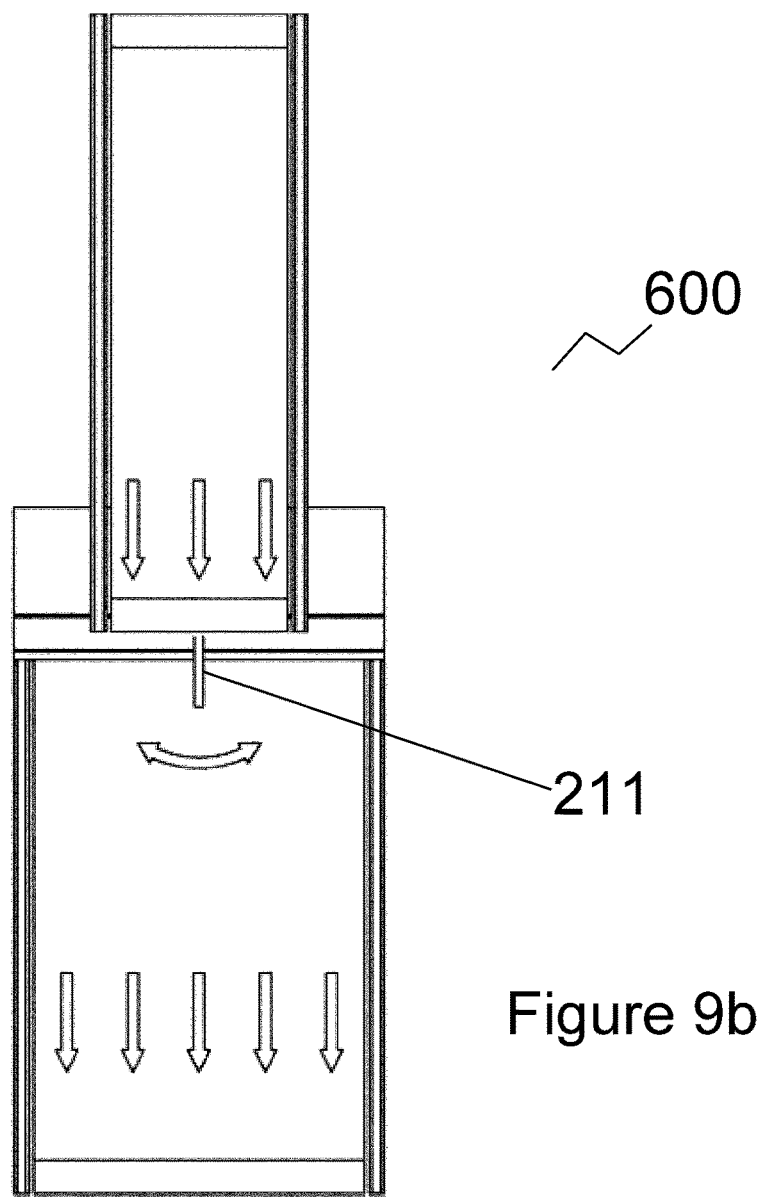
Figure 9C:
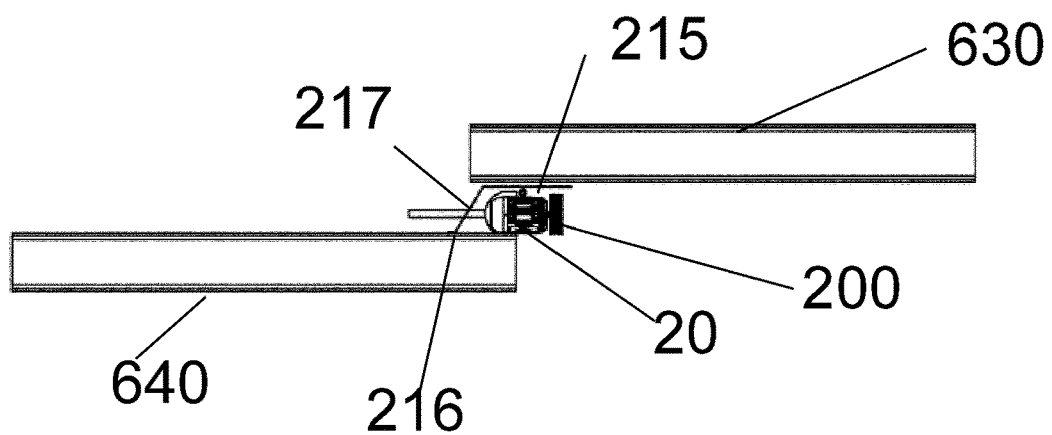

FIGS. 9a to 9c show an alternative preferred distribution apparatus, generally referred to herein by reference numeral 200, incorporated in material handling machine 600 according to the invention. As shown, apparatus 200 comprises protruding element 210 drivable in oscillation about a vertical axis by drive mechanism 20. Protruding element 210 comprises an elongate hollow pole 211 attached to follower fork 25 of drive mechanism 20.

Distribution apparatus 200 is shown attached to machine 600 between upper conveyor 630 and lower conveyor 640 such that apparatus 200 distributes material from conveying portion 631 of upper conveyor 630 to receiving portion 641 of lower conveyor 640. In the embodiment shown elongate pole 211 of apparatus 200 extends through an aperture (not shown) of angled bracket 214. Angled bracket 214 has top section 215 for attachment to upper conveyor 630, shorter base section 216 for attachment to downstream conveyor 640 and mid-section 217 containing the aperture through which elongate pole 211 extends. Top section 215 and base section 216 are parallel to each other with mid-section 217 connecting the two such that the angle between top section 215 and mid-section 217 is about 135°.

The arrows on upper conveyor 630 and lower conveyor 640 show the respective directions of conveyance. The arrows adjacent protruding element 210 show how this oscillates back and forth in a direction transverse to said direction of conveyance. That is, protruding element 210 extends in the direction of conveyance of upper conveyor 630 thus receiving material at an angle of 0°. As the direction of conveyance of upper conveyor 630 and lower conveyor 640 is the same, protruding element 210 also extends in the direction of conveyance of lower conveyor 640 and is adapted to oscillate in a direction transverse to said direction of conveyance.

In the embodiment shown in FIGS. 9a to 9c, angled bracket 214 is mounted underneath upper conveyor 630 such that protruding element 210 extends through mid-section 217 and is above receiving portion 641 of lower conveyor 640.

FIGS. 10a and 10b show distribution apparatus 200 incorporated in material handling machine 700 according to the invention. Distribution apparatus 200 is shown attached to machine 700 under chute 750 and between upper conveyor 730 and lower conveyor 740 such that apparatus 200 distributes material received from conveying portion 731 of upper conveyor 730 to receiving portion 741 of lower conveyor 740. In particular, apparatus 200 is shown mounted above receiving portion 741 of lower conveyor 740.

The arrows on upper conveyor 730 and lower conveyor 740 in FIG. 10a show the respective directions of conveyance. Protruding element 210 extends in the direction of conveyance of lower conveyor 740. The arrows adjacent protruding element 210 in FIG. 10a show how protruding element 210 oscillates back and forth in a direction transverse to the direction of conveyance of lower conveyor 740. Whilst upper conveyor 730 is at an angle of 45° to lower conveyor 740, chute 750 ensures that protruding element 210 receives material at an angle of 0°.

Figure 11B:
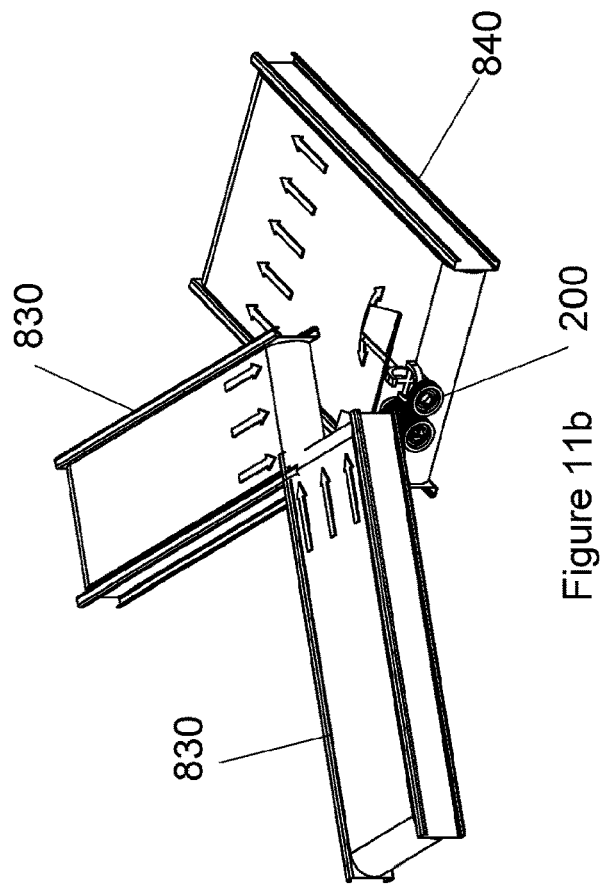
Figure 11C:
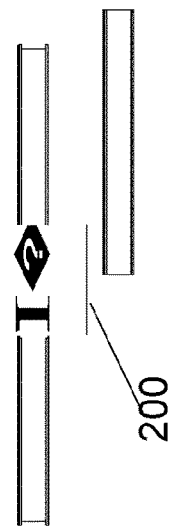
Figure 11A:
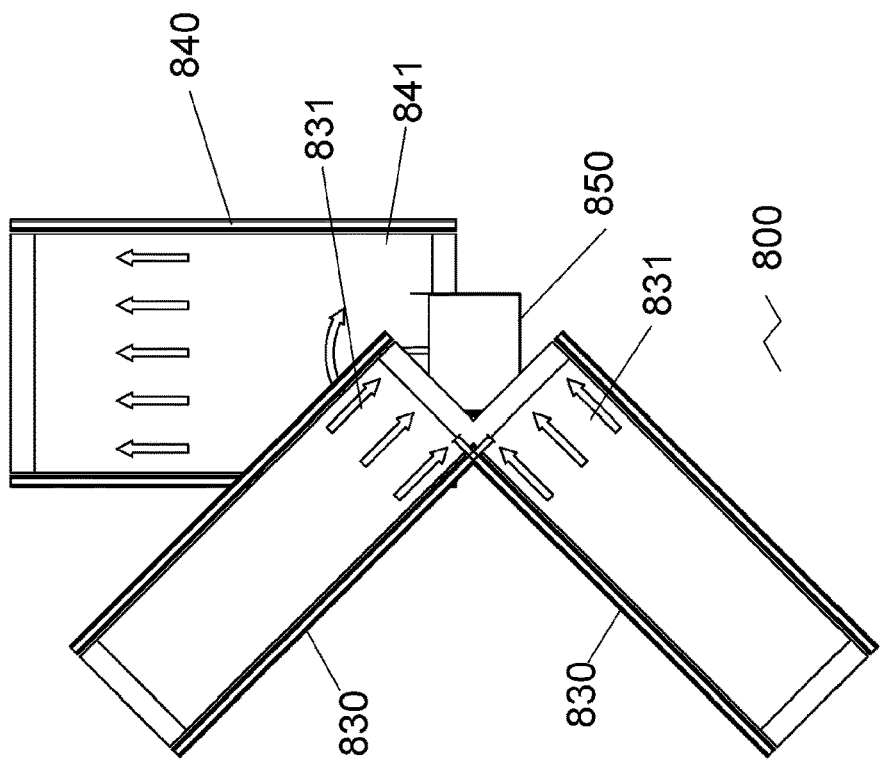

FIGS. 11a to 11c show distribution apparatus 200 incorporated in material handling machine 800 according to the invention. Apparatus 200 is shown attached to machine 800 under chute 850 and between two upper conveyors 830 and lower conveyor 840 such that apparatus 200 distributes material from conveying portions 731 of each upper conveyor 730 to receiving portion 841 of lower conveyor 840. In particular, apparatus 200 is shown mounted above receiving portion 841 of lower conveyor 840.

The arrows on upper conveyors 830 and lower conveyor 840 in FIGS. 11a and 11b show the respective directions of conveyance. Protruding element 210 extends in the direction of conveyance of lower conveyor 840. The arrows adjacent protruding element 210 in FIGS. 11a and 11b show how protruding element 210 oscillates back and forth in a direction transverse to the direction of conveyance of lower conveyor 840. Whilst upper conveyors 830 are at an angle of 45° and 135°, to lower conveyor 740, respectively, chute 850 ensures that protruding element 210 receives material at an angle of 0°.

Figure 12:
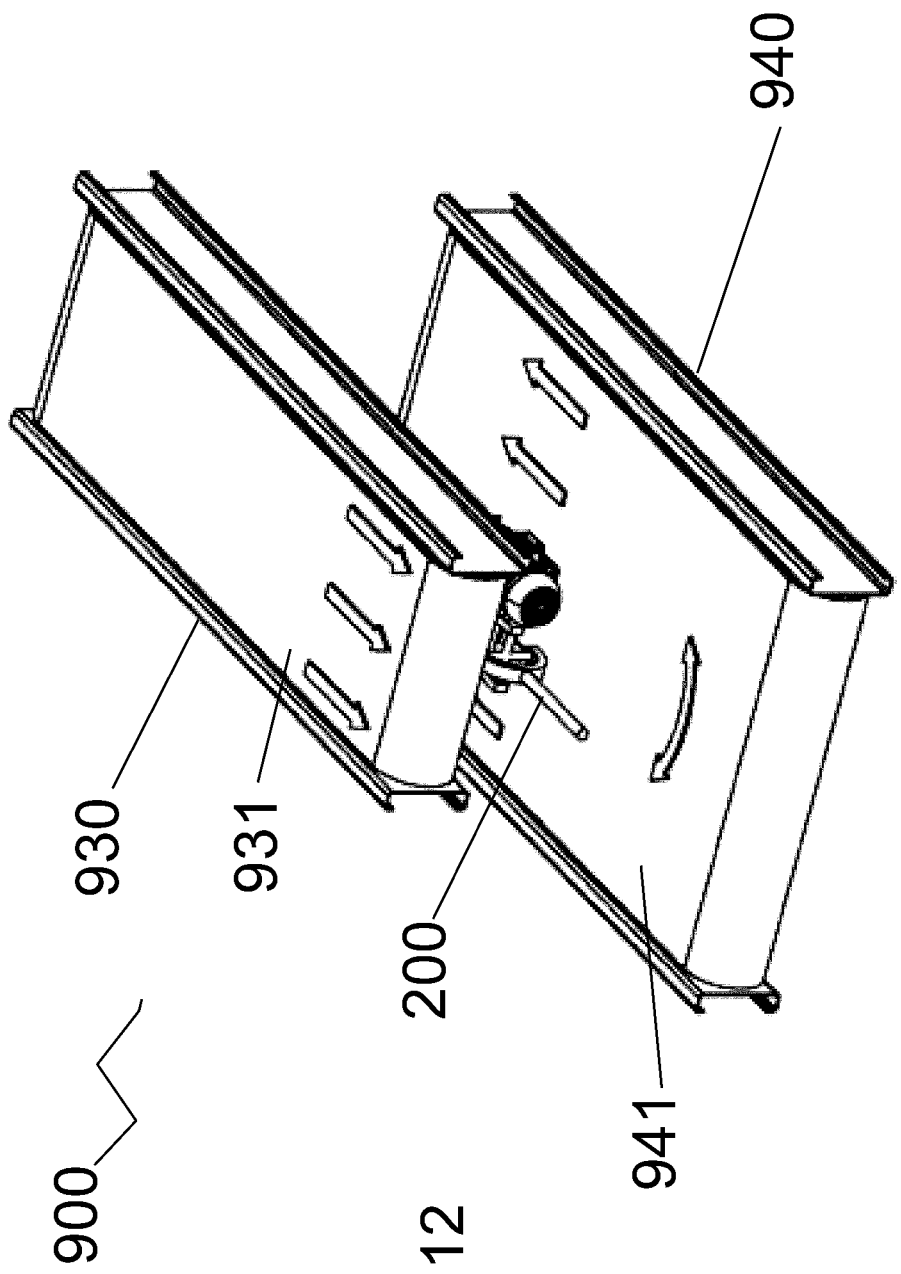

FIG. 12 shows distribution apparatus 200 incorporated in material handling machine 900 according to the invention. Apparatus 200 is shown attached to machine 900 between upper conveyor 930 and lower conveyor 940 such that apparatus 200 distributes material from conveying portion 931 of upper conveyor 930 to receiving portion 941 of downstream conveyor 940.

The arrows on upper conveyor 930 and downstream conveyor 940 in FIG. 12 show the respective directions of conveyance. The arrows adjacent protruding element 210 show how this oscillates back and forth in a direction transverse to said direction of conveyance. That is, protruding element 210 extends in the direction of conveyance of upper conveyor 930 thus receiving material at an angle of 0° and is adapted to oscillate in a direction transverse to said direction of conveyance. As the directions of conveyance of upper conveyor 930 and lower conveyor 940 are opposite to each other, protruding element 210 extends in the opposite direction to the direction of conveyance of lower 940.

In the embodiment shown in FIG. 12, apparatus 200 is mounted under conveying portion 931 of upper conveyor 930 such that protruding element 210 is above receiving portion 941 of lower conveyor 940.

It is to be understood that the invention is not limited to the specific details described herein which are given by way of example only and that various modifications and alterations are possible without departing from the scope of the invention as defined in the appended claims.

The invention claimed is:

1. A machine for handling waste material, the machine comprising:
    an upper conveyor member with a conveying portion of a first width wherein said upper conveyor member has a first conveyance direction;
    a downstream lower conveyor member with a receiving portion of a second width that is at least as wide as said first width, wherein said lower conveyor has a second conveyance direction; and
    an apparatus for distributing the waste material from the upper conveyor member to the downstream lower conveyor member, wherein the apparatus comprises:
        an oscillating means;
        a drive mechanism connected to the oscillating means; and
        a protruding element attached to the oscillating means, wherein said protruding element oscillates at a speed between 50 oscillations per minute and 250 oscillations per minute, and wherein the protruding element is a reciprocating attachment that extends in a first direction and oscillates in a second direction that is transverse to the first direction;
    wherein the apparatus is mountable between the conveying portion of the upper conveyor member and the receiving portion of the downstream lower conveyor member such that the protruding element extends substantially in the second conveyance direction of the downstream conveyor member; and
        wherein in use the oscillating protruding element agitates the waste material being transferred from the upper conveyor member to the downstream lower conveyor member.

2. The machine of claim 1, wherein the protruding element of the distribution apparatus extends in the first conveyance direction of the upper conveyor member.

3. The machine of claim 1, wherein the protruding element of the distribution apparatus comprises at least one extending portion.

4. The machine claim 1, wherein the protruding element of the distribution apparatus comprises a plurality of extending portions at an angle α to one another, wherein angle α is in a range between 1° and 20°.

5. The machine of claim 4, wherein each plurality of extending portions independently has a cross-section selected from a group that includes a circular cross-section, an L-shaped cross-section, a T-shaped cross-section, a U-shaped cross-section, a rectangular cross-section and a square cross-section.

6. The machine of claim 4, wherein the distribution apparatus further comprises an end plate and each of the extending portions is attached to the end plate such that each of the plurality of extending portions points downwards.

7. The machine of claim 6, wherein each of the plurality of extending portions is attached to the end plate such that each of the plurality of extending portions points downwards at an angle β from an orthogonal position, wherein angle β is in the range between 2° and 25° from the orthogonal position.

8. The machine of claim 1, wherein the drive mechanism of the distribution apparatus comprises an electric motor.

9. The machine of claim 1, wherein the oscillating means of the distribution apparatus comprises a rotating flywheel and reciprocating arm.

10. The machine of claim 1, wherein the upper conveyor member is selected from a group that includes an auger feeder, a vibratory feeder and a conveyor belt.

11. The machine of claim 1, wherein the downstream lower conveyor member is selected from a group that includes a conveyor belt, a vibratory feeder, a screening machine and a shredder.

12. The machine of claim 1, wherein the protruding element of the distribution apparatus comprises at least three extending portions.

13. The machine according to claim 5, wherein each of the plurality of extending portions is an elongate pole.

* * * * *